United States Patent
Verrelst et al.

(10) Patent No.: US 12,429,039 B2
(45) Date of Patent: Sep. 30, 2025

(54) PISTON COMPRESSOR AND METHOD IN WHICH SUCH A PISTON COMPRESSOR IS USED

(71) Applicants: ATLAS COPCO AIRPOWER, NAAMLOZE VENNOOTSCHAP, Wilrijk (BE); VRIJE UNIVERSITEIT BRUSSEL, Brussels (BE)

(72) Inventors: Björn Verrelst, Wilrijk (BE); Jarl Beckers, Brussels (BE)

(73) Assignees: ATLAS COPCO AIRPOWER, NAAMLOZE VENNOOTSCHAP, Wilrijk (BE); VRIJE UNIVERSITEIT BRUSSEL, Brussels (BE)

( * ) Notice: Subject to any disclaimer, the term of this patent is extended or adjusted under 35 U.S.C. 154(b) by 645 days.

(21) Appl. No.: 17/413,092

(22) PCT Filed: Dec. 3, 2019

(86) PCT No.: PCT/IB2019/060400
§ 371 (c)(1),
(2) Date: Jun. 11, 2021

(87) PCT Pub. No.: WO2020/128697
PCT Pub. Date: Jun. 25, 2020

(65) Prior Publication Data
US 2022/0042502 A1 Feb. 10, 2022

(30) Foreign Application Priority Data
Dec. 18, 2018 (BE) .................................. 2018/5896

(51) Int. Cl.
*F04B 35/04* (2006.01)
*F04B 39/00* (2006.01)
(Continued)

(52) U.S. Cl.
CPC ........ *F04B 35/045* (2013.01); *F04B 39/0022* (2013.01); *F04B 39/0094* (2013.01);
(Continued)

(58) Field of Classification Search
CPC ..................... F04B 35/045; F04B 39/0022; F04B 39/0094; F04B 49/06; F04B 49/065;
(Continued)

(56) References Cited

U.S. PATENT DOCUMENTS 1,036,328 A * 8/1912 Pierce .................. F04B 27/0895
417/16
3,773,439 A * 11/1973 Sheridan ................ H02K 49/10
417/415
(Continued)

FOREIGN PATENT DOCUMENTS

DE 10 2006 060 147 A1 6/2008
EP 0 566 959 A1 10/1993
(Continued)

OTHER PUBLICATIONS

ES2324442 translation (Year: 2023).*
(Continued)

*Primary Examiner* — David N Brandt
(74) *Attorney, Agent, or Firm* — Sughrue Mion, PLLC (57) ABSTRACT

A piston compressor, including at least one piston compressor element (3) that is provided with a housing (8) with a compression chamber (13) in which a piston (10) is arranged movably back and forth in an axial direction (X-X') between an upper dead point and a lower dead point by means of a drive shaft (5) driven by a rotary motor (6), and in which between this drive shaft (5) and the piston (10), a kinematic transmission (20) is provided for the primary drive of the
(Continued)

piston (10), wherein the piston (10) is provided with a complementary drive (25) in the form of an electromagnetic linear drive.

19 Claims, 5 Drawing Sheets

(51) Int. Cl.
    *F04B 49/06*     (2006.01)
    *F04B 53/00*     (2006.01)
    *F04B 53/14*     (2006.01)
    *H02K 7/06*     (2006.01)
    *H02K 7/075*     (2006.01)
    *H02K 16/00*     (2006.01)
    *H02K 33/00*     (2006.01)
    *H02K 33/12*     (2006.01)

(52) U.S. Cl.
    CPC ........... *F04B 49/065* (2013.01); *F04B 53/006* (2013.01); *F04B 53/144* (2013.01); *H02K 7/06* (2013.01); *H02K 7/075* (2013.01); *H02K 16/00* (2013.01); *H02K 33/00* (2013.01); *H02K 33/12* (2013.01)

(58) Field of Classification Search
    CPC .... F04B 53/006; F04B 53/144; F04C 15/008; H02K 7/06; H02K 7/075; H02K 16/00; H02K 33/00; H02K 33/12
    See application file for complete search history.

(56) References Cited

U.S. PATENT DOCUMENTS

| | | | | |
|---|---|---|---|---|
| 4,321,021 | A | * | 3/1982 | Pauliukonis ......... F04B 17/042 222/340 |
| 2004/0213679 | A1 | * | 10/2004 | Cornwell ............. F04B 49/225 417/440 |
| 2017/0284386 | A1 | * | 10/2017 | Nakaniwa ......... H01J 37/32935 |
| 2018/0066802 | A1 | | 3/2018 | Brun et al. |

FOREIGN PATENT DOCUMENTS

| | | | | |
|---|---|---|---|---|
| ES | 2324442 A1 | * | 8/2009 | ............. H02K 7/075 |
| WO | 2018/037135 A1 | | 3/2018 | |

OTHER PUBLICATIONS

International Search Report of PCT/IB2019/060400 dated Feb. 5, 2020 [PCT/ISA/210].
Written Opinion of PCT/IB2019/060400 dated Feb. 5, 2020 [PCT/ISA/237].

* cited by examiner

PISTON COMPRESSOR AND METHOD IN WHICH SUCH A PISTON COMPRESSOR IS USED

CROSS REFERENCE TO RELATED APPLICATIONS

This application is a National Stage of International Application No. PCT/IB2019/060400, filed Dec. 3, 2019, claiming priority to Belgian Patent Application No. 2018/5896, filed Dec. 18, 2018.

The present invention relates to a piston compressor.

More specifically, but without limitations, the invention relates to a high power piston compressor, for instance a power of more than 30 kW to 600 kW or higher.

Such piston compressors are used, for instance, for the compression of gases at a very high operating pressure, for instance of 2000 kPa or more.

As is commonly known, a piston compressor comprises a piston compressor element that is provided with a housing with a compression chamber, in which a piston is arranged movably back and forth in an axial direction between an upper dead point and a lower dead point by means of a drive shaft driven by a rotary motor, and in which a kinematic transmission is provided between this drive shaft and the piston in the form of a crank and rod mechanism, and possibly also an extra piston rod that moves linearly with the piston and forms a connection between the piston and the crank and rod mechanism.

For the realization of such high gas pressures, usually, a multistage piston compressor is used with two or more of the aforementioned piston compressor elements that are serially connected with each other via their gas inlets and their gas outlets, and which are mounted on a joint drive group in the form of a housing in which a joint drive shaft is supported, with a crank and rod mechanism connected to each piston compressor element and possibly a piston rod for the connection between the pistons with the crank and rod mechanism.

The drive group is provided with a single rotary motor, typically an electrical motor, for driving the joint drive shaft, in most cases via a belt drive. Such a belt drive has the advantage of being relatively inexpensive, but it also has the disadvantage of being responsible for a relatively large loss of power of up to 3 to 5% of the delivered power of the motor.

It goes without saying that the drive group must be designed to handle the full power of the motor, and therefore also its full compression power, and it is therefore relatively heavy and bulky in case of a piston compressor with a high power.

As a function of the required power, the constructor of such piston compressors will offer a discrete series of drive groups, each having a different power, onto which a number of standardized piston compressor elements are mounted in order to meet the user's needs in terms of the deliverable flow rate and pressure of the compressed gas.

In view of the limited choice of drive groups, it is a disadvantage that for intermediate powers, always a drive group has to be selected from the series with a higher power, which will obviously be more expensive and also bring about more losses, for instance at the location of the bearings.

In view of the high mechanical forces, typically, oil film bearings are used, which may be responsible for a loss of power between 5 and 10%.

The most significant limiting factor when choosing a suitable combination of drive group and piston compressor elements is the mechanical load of the connection between the crank and rod mechanism, more specifically the critical load of the piston rod and of the articulation between the piston rod and the crank and rod mechanism or between the piston and the crank and rod mechanism, when there is no piston rod, which load is the result of the impact of the gas forces and of the inertia forces.

This limiting factor may lead to a choice for a more expensive over-dimensioned drive group or for the application of multiple drive groups at a higher cost in order to meet the flow rate and pressure requirements.

Also previously known is an application in which a piston is moved back and forth by electromagnetic linear actuation in order to compress a gas in a compression chamber. This application is limited to low powers, however. Academic research of higher powers has led to extremely heavy and bulky compressors with, for instance, a piston of 400 kg for a power of 30 kW.

Moreover, this application requires a complicated motion control with wide safety margins, in order to prevent a collision between the head of the piston and the end wall of the compression chamber at the end of the compression stroke.

The aim of the present invention is to provide a solution for one or more of the aforementioned and/or other disadvantages.

To this aim, the invention relates to a piston compressor comprising at least one piston compressor element that is provided with a housing with a compression chamber in which a piston is arranged movably back and forth in an axial direction between an upper dead point and a lower dead point by means of a drive shaft driven by a rotary motor and in which a kinematic transmission is provided between this drive shaft and the piston for the primary drive of the piston, the piston being provided with a complementary drive in the form of an electromagnetic linear drive.

Because besides the traditional drive by way of a crank and rod mechanism, the piston is now also driven complementarily in a second independent manner in combination with a rotary motor, the traditional crank and rod mechanism or another kinematic transmission can be partially relieved by exerting a complementary electromagnetic force on the piston in the direction of the upper dead point at the right moment during the compression phase.

The critical load of the mechanical transmission between the kinematic transmission and the piston, of which a possible piston rod may be part, thus becomes much less critical, depending on the share of the complementary drive with respect to the primary drive of the rotary motor and the belt drive.

This also adds a degree of freedom in the design for determining the optimal and most cost-effective combination of drive group and piston compressor element for obtaining a desired flow rate and a desired pressure.

Typically, this requires a complementary electromagnetic power injection of 20 to 30% of the total power requirement in order to allow to sufficiently relieve the piston rod.

Due to the invention, it is now possible to go one step further by further increasing the share of the complementary electromagnetic drive, for instance to 80 to 90% of the total power requirement, but without giving up the kinematic transmission.

Due to the larger share of the complementary electromagnetic drive, for a given desired flow rate and a given desired pressure, a smaller and therefore less expensive drive group and motor may be selected, as a result of which the losses in the bearings may be reduced as well and less expensive, traditional ball bearings with a lower loss may be opted for.

Due to the smaller motor, a less heavy belt transmission may be used, with a lower loss.

Keeping the kinematic transmission ensures that there is no risk for the piston not being able to collide in its upper dead point at the end of the compression stroke with the end wall of the compression chamber, allowing the piston to move until it is very close to this end wall, with a minimal headroom between the two. This is useful, because the smaller the headroom, the larger the beneficial generated pressure of the gas in the compression chamber, and the higher the volumetric efficiency of the compressors.

Moreover, no complex control is needed for maintaining a minimal headroom, and no large safety margin must be taken into account thereto.

The complementary electromagnetic drive may comprise a direct electromagnetic drive, having a direct electromagnetic influence on the piston via one or several electrical coils around or along the compression chamber.

Furthermore or alternatively, the complementary electromagnetic drive may comprise an indirect electromagnetic drive of the piston, with a plunger that is connected with the piston and moves synchronously back and forth with it in a linear guide that extends parallel to the axial direction of the compression chamber, and with one or several coils arranged around or along the linear guide that are capable of interacting inductively with the respective plunger.

The piston compressor may be a multistage compressor with at least two individual piston compressor elements, each having a piston that is movable back and forth in a compression chamber in an axial direction, and which is driven by means of a joint drive shaft and a rotary motor, and in which an individual kinematic transmission for driving the pistons is provided between this drive shaft and each of the at least two individual piston compressor elements, and a said complementary linear electromagnetic drive of the piston is provided for each of the at least two piston compressor elements.

The invention also relates to a method in which a piston compressor as described above is used.

It relates to a method for compressing a gas by means of a piston compressor element with a piston which, when operating, is periodically moved back and forth in a compression chamber in an axial direction between an upper dead point and a lower dead point by means of a kinematic transmission driven by a rotary motor, in which the piston is additionally driven by means of a complementary electromagnetic linear drive during at least a part of the period of the back and forth movement of the piston.

The benefits are the same as described above.

Preferably, the piston is electromagnetically driven at least during the compression stroke phase of the piston, during which the pressure in the compression chamber is highest.

Preferably, during the compression stroke or during a part thereof, at least 20 to 30% and up to at least 80 to 90% of the required compression power is supplied by the complementary linear electromagnetic drive, the rest being supplied by the rotary motor (6). In order to better demonstrate the features of the present invention, some examples are described hereinafter, in an exemplary manner and without any restrictive character, of a piston compressor and of a method according to the invention, with reference to the accompanying figures, wherein.

Figure 1:
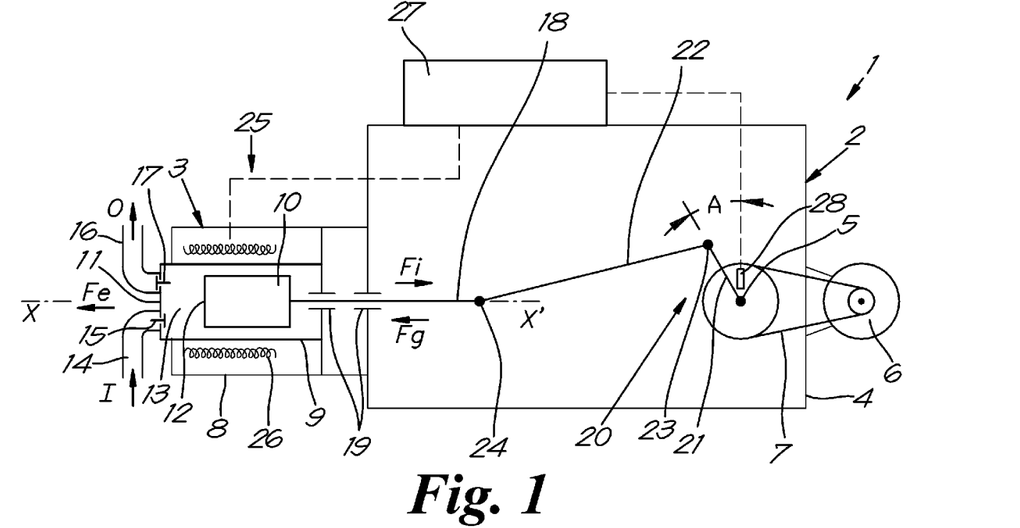
FIG. 1 is a schematic representation of a piston compressor according to the invention.

The piston compressor 1 shown in FIG. 1 comprises a drive group 2 and a piston compressor element 3 mounted onto it.

The drive group 2 comprises a housing 4, in which a drive shaft 5 is rotatably supported and is driven by means of an electrical rotary motor 6 via a belt transmission 7.

The piston compressor element 3 is provided with a housing 8 mounted on the housing 4 of the drive group 2, being provided with a cylinder mantle 9 in which a piston 10 is arranged movably back and forth in an axial direction X-X', and which is closed off on one side by an end wall 11.

Between the piston crown 12, the aforementioned end wall 11, and the cylinder mantle 9 of the piston compressor element 3, a compression chamber 13 is enclosed, connected in a commonly known manner via a sealable inlet 14 with an inlet valve 15 and via a sealable outlet 16 with an outlet valve 17 with the surroundings for suctioning in a gas to be compressed as indicated by arrow I, and for discharging the gas at the end of a compression stroke in the direction of arrow O.

During the compression stroke, the piston 10 moves from a so-called lower dead point farthest from the end wall 11 in the direction of the end wall 11 to a so-called upper dead point closest to the end wall 11, and does so with closed inlet and outlet valves 15 and 17.

At the upper dead point, the volume of the compression chamber 13, the so-called dead volume, is smallest, and the pressure of the gas in the compression chamber 13 at that moment is highest.

Connected to the piston 10 is a piston rod 18, extending in the axial direction X-X' and capable of moving synchronously back and forth with the piston 10 in a sealed guide 19 of the housing that forms a gas seal between the housing 8 of the piston compressor element 3 and the housing 4 of the drive group 2.

Between the piston rod 18 and the drive shaft 5, a kinematic transmission 20 is provided for the transformation of the rotary movement of the drive shaft 5 into a back and forth movement of the piston 10.

In the case of FIG. 1, this is a crank and rod mechanism with a radially oriented crank 21 that rotates with the drive shaft 5 and a thereto attached driving rod 22 that is pivotally attached on one end with the crank 21 by means of a crank pin 23, and on the other end with the piston 10 or the piston rod 18 by means of a piston pin 24.

It is specific to the invention that in addition to a primary drive of the piston by means of the motor 6 and the kinematic transmission 20, there is also a complementary drive 25 of the piston 10 in the form of an electromagnetic linear drive, formed by one or several electrical coils 26 arranged around or along the cylinder chamber 13 and which, if excited by a control 27, can directly interact inductively with the piston 10 that is designed for that purpose in a suitable magnetically conducting material, or provided, for instance, with one or several permanent magnets.

Alternatively or complementarily, the piston 10 may also be provided with coils that can interact inductively with the cylinder mantle, made of an electromagnetic material or provided with permanent magnets.

The operation of the piston compressor is simple, as follows:

Without exciting the complementary drive 25, the operation of the piston compressor 1 is entirely analogous to that of a traditional piston compressor that is only driven primarily by means of the motor 6.

In this case, the drive shaft 5 is driven by the motor 6 in one direction, such that the crank 21 is brought into a rotary movement and the piston 10 is moved back and forth.

With any suctioning stroke from the upper dead point to the lower dead point, gas is suctioned into the compression chamber 13 via the inlet 14, whereas with any movement in the opposite direction from the lower dead point to the upper dead point, the suctioned gas is compressed as the inlet valve 15 and the outlet valve 17 are closed.

Figure 2:
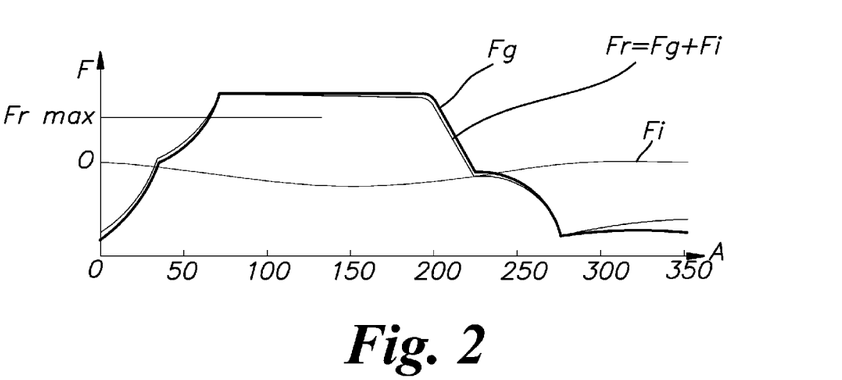
FIGS. 2 and 3 represent a graph of the forces acting when the piston compressor of FIG. 1 is used, respectively without and with the use of the invention.

During operation, the piston rod 18 and the piston pin 24 are subject to gas forces Fg and to sinusoidal inertia forces Fi and possible harmonics as shown in FIG. 1, of which the momentary value is shown in the graph of FIG. 2 as a function of the pivoting angle A of the crank 21. It goes without saying that the gas force Fg is proportional to the required operating pressure of the piston compressor 1.

In this graph, the resulting force Fr exerted onto the piston rod 18 and onto the piston pin 24, which is the sum of the forces Fg and Fi, is also shown. During the compression stroke of the piston 10, this is a compression force whereby the piston rod 18 is compressed.

Constructively, this resulting force may not be higher than a certain maximum value Frmax that is determined primarily by the compressive strength of the piston rod 18 and/or the strength of the piston pin 24 and its bearings.

In the case of FIG. 2, it is established that without a complementary drive, the value Frmax will be exceeded by the strong gas forces Fg corresponding to a certain operating pressure of the piston compressor 1.

Without excitation of the complementary drive 25, the piston compressor 1 is therefore not suitable for such a gas pressure and the corresponding operating pressure, and a piston compressor 1 should therefore be chosen with a greater format and a greater power.

In order to avoid this, according to the invention, the coil 26 can be excited during the compression stroke of the piston 10 in order to induce an opposing electromechanical tractive force Fe on the piston 10, which is also transposed onto the piston rod 18 and onto the piston pin 24, and which ensures the pressure relief on the piston rod 18 and on the piston pin 22.

Figure 3:
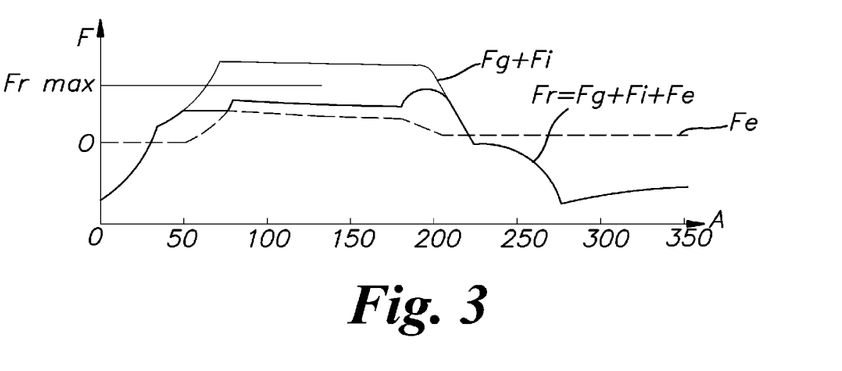

This tractive force Fe, added to the resulting force Fg+Fi of FIG. 2, results in a lower resulting force Fg+Fi+Fe as shown in the graph of FIG. 3, in which also the force Fg+Fi of FIG. 2 is shown besides the complementary induced electromechanical force Fe.

In this case, the resulting force Fg+Fi+Fe remains under the limit Frmax.

Due to the complementary electromagnetic drive 25, a switch to a heavier piston compressor 1 without limiting the operating pressure can therefore be avoided, so that the respective piston compressor 1 can therefore be used in a larger field of operation.

Typically, a share of the required complementary electromagnetic power of 20% to 30% of the total electrical power will be recommended for this.

In order to excite the coils, preferably only during the compression stroke or part thereof, the control 27 is provided with means for determining the momentary position of the crank 21, for instance a probe for measuring the angle A.

Figure 4:
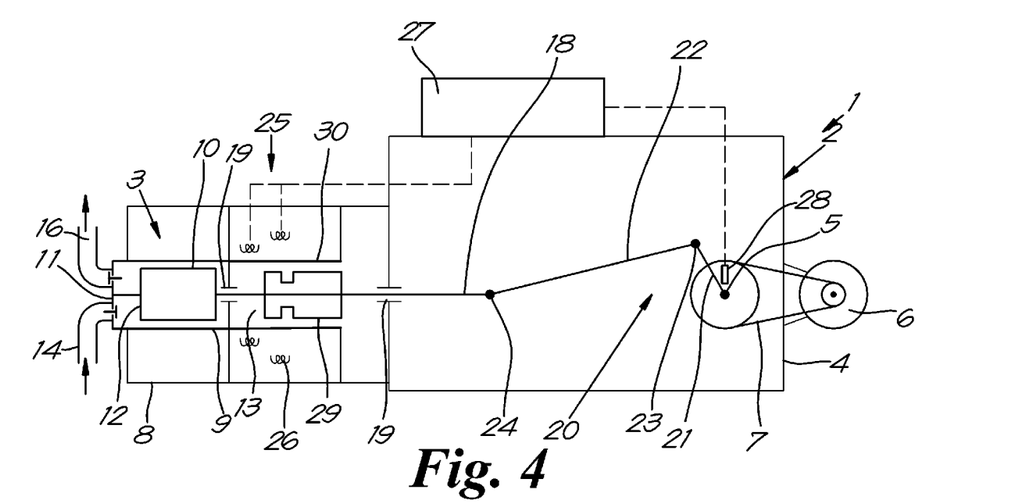
FIG. 4 represents a variant of a piston compressor according to the invention.

FIG. 4 shows a variant of a piston compressor 1 according to the invention, in which in this case, the piston 10 is a traditional piston without coils 26 around the cylinder mantle 9, but the complementary drive 25 of the piston is realized by means of an internal plunger 29 that is mounted on the piston rod 18, and which is arranged back and forth movably in a linear guide 30 or enclosure with one or several coils 26 around or along it which, when excited, can interact inductively with the respective plunger 29 in order to electromagnetically drive the piston 10 indirectly during the compression stroke.

The guide 30 or the enclosure is arranged in the axial extension of the cylinder mantle 9.

Figure 5:
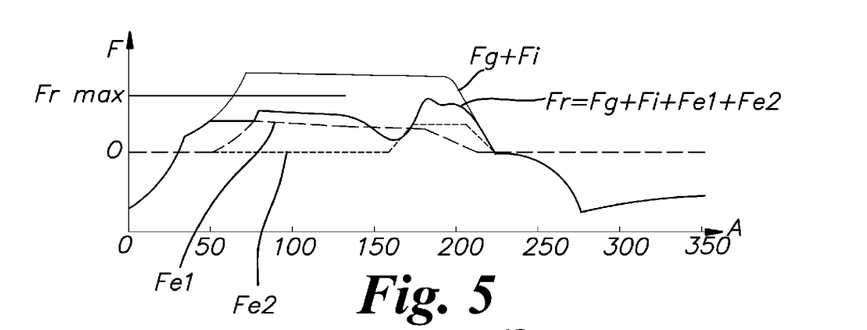
FIG. 5 represents a graph as in FIG. 3, but for the piston compressor of FIG. 4.

In the case of FIG. 4, there are two coils 26 capable of interacting electromagnetically with the plunger 29, such that when these coils 26 are excited, two independent electromagnetic forces Fe1 and Fe2 can be generated according to a development as shown in the graph of FIG. 5.

Figure 6:
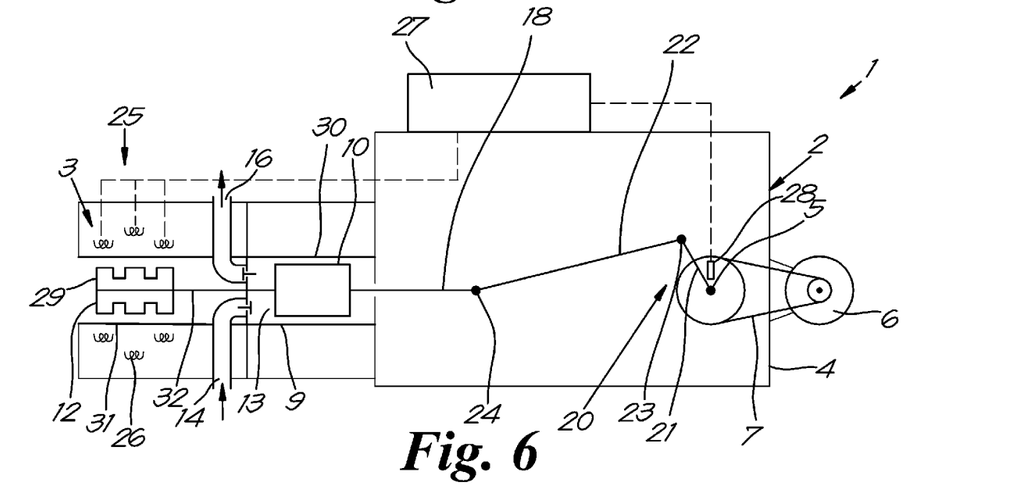
FIG. 6 represents a different variant of a piston compressor according to the invention.

FIG. 6 shows yet another embodiment of a piston compressor 1 according to the invention that is comparable with the embodiment of FIG. 4, but with this difference, that in this case, the plunger 29 is arranged externally in an external linear guide 31 surrounded by coils 26 for inducing an electromagnetic force onto the plunger 29 via a connection rod 32 extending externally through the compression chamber 13 and the aforementioned end wall 11, which force is therefore indirectly also exerted on the piston 10.

Figure 7:
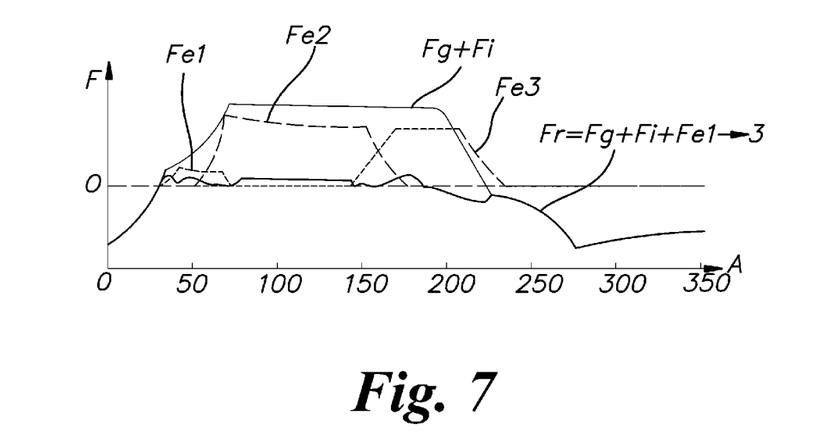
FIG. 7 represents a graph as in FIG. 5, but for the piston compressor of FIG. 6.

Furthermore, in this case, three coils 26 are provided for allowing a better modulation of the exerted electromagnetic forces during the compression phase, as shown in the graph of FIG. 7.

It is clear that a combination is also possible of a direct excitation of the piston 10 with an indirect excitation via an internal or external plunger 29.

It is furthermore possible to execute the piston 10 and one or several plungers 29 as a linear motor, more specifically as a linear step motor.

Figure 8:
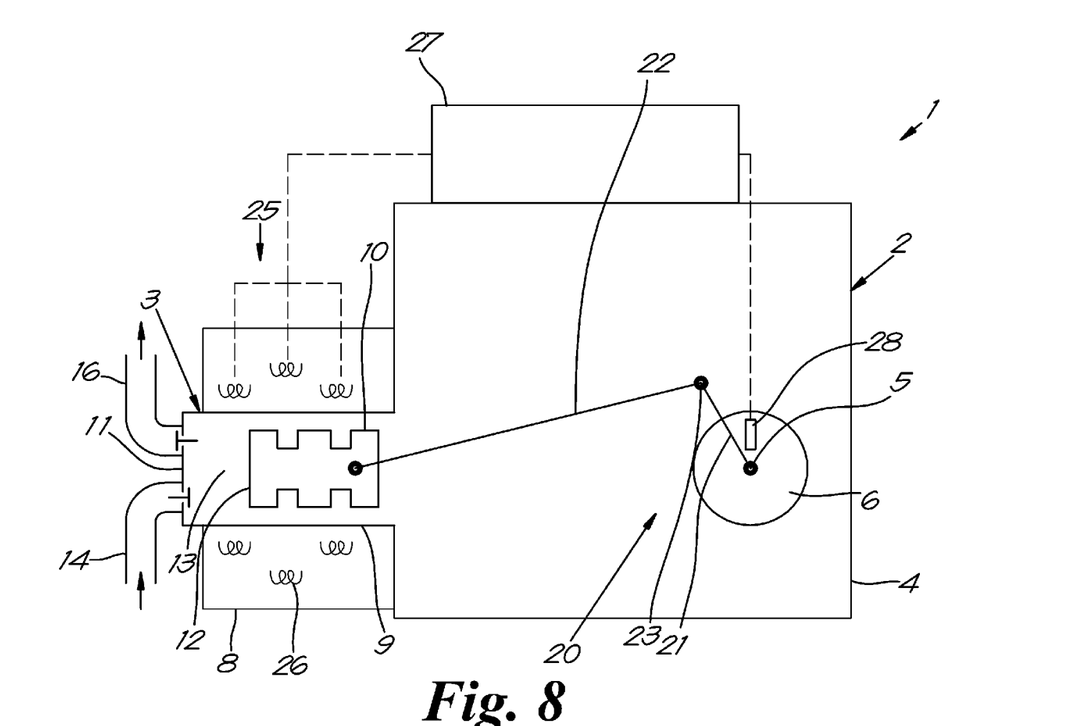
FIGS. 8, 9, and 10 show other embodiments of a piston compressor according to the invention.

The invention is also applicable to a piston compressor 1 without a piston rod 18 between the piston 10 and the kinematic transmission 20, as in the case of FIG. 8, in which the piston 10 is connected directly with the driving rod 22 by means of the piston pin 24, and in which the electromagnetic drive 25 is located at the location of the piston 10.

In this case, the electromagnetic drive 25 may be used in order to relieve the piston pin 24 at a share of 20 to 30% of the electromagnetic power.

A larger share of the electromagnetic power of 80 to 90%, for instance, may cause the relief of the piston rod 18 and/or the piston pin 24 to lead to the realization of an additional advantage, in the sense that this greater power share makes it possible to select a drive group 2 and a motor 6 with a much smaller power, which may lead to space and cost savings and furthermore to a drastic reduction of the losses in the belt drive and in the bearings 33, which can now be replaced, for instance, by ball bearings instead of the oil film bearings that are traditionally used with high power piston compressors.

In this case, one might speak of a power support in which the largest share of the power is supplied by the electromagnetic drive 25, as compared with a support for the restriction of the forces in the piston rod 18 and the piston pin 24, for which a smaller share, for instance 20 to 30% of the electromagnetic drive 25, is sufficient.

Figure 9:
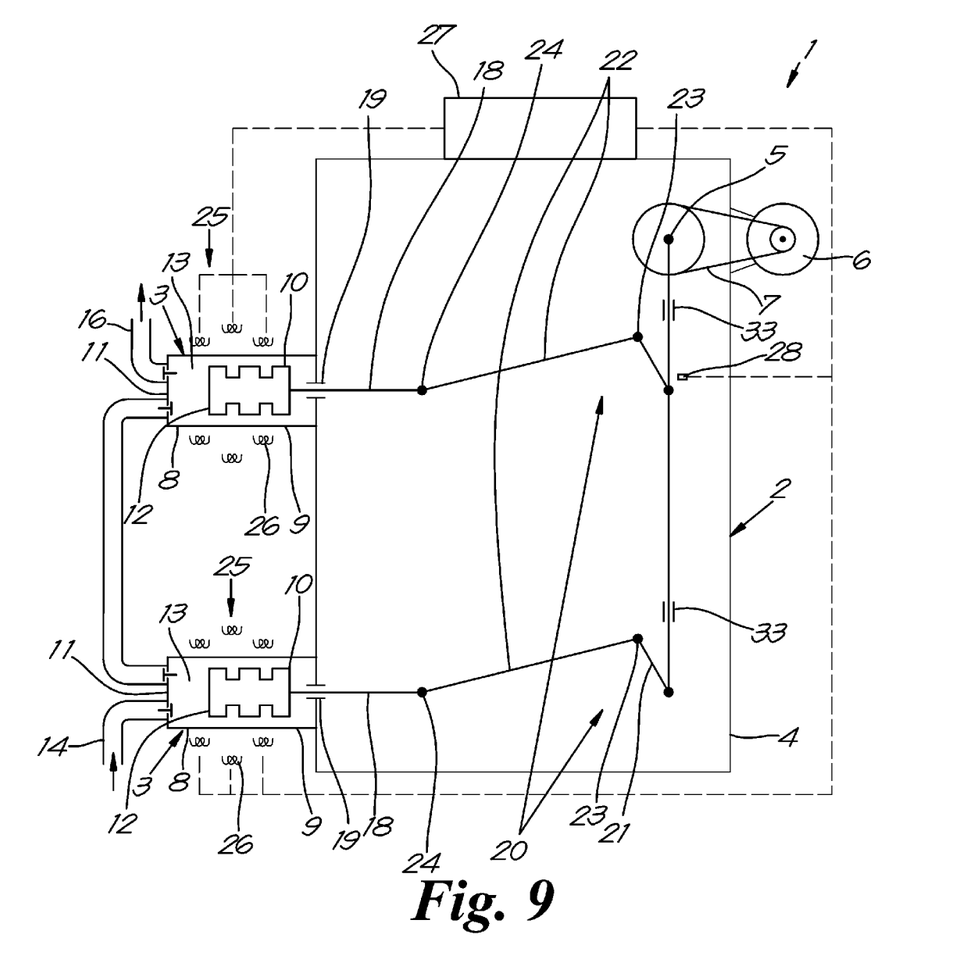
Figure 10:
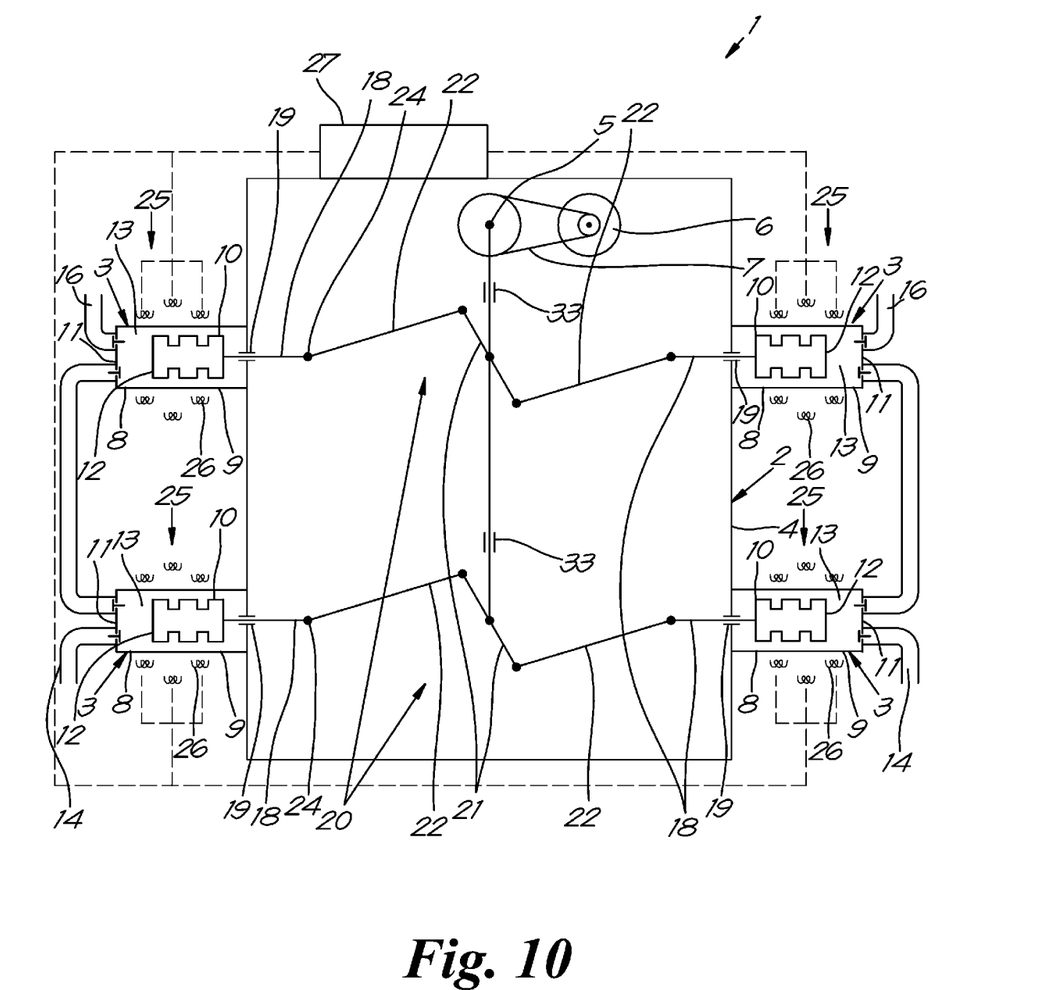

FIGS. 9 and 10 are multistage compressors 1 according to the invention with two, respectively four, individual piston compressor elements 3, mounted modularly on a joint drive group 2 with a joint motor 6 and drive shaft 5.

For each individual piston compressor element 3, an individual kinematic transmission 20 is provided for driving the piston 10, and for each piston compressor element 3, an aforementioned complementary linear electromagnetic drive 25 is provided.

When acquiring such a multistage piston compressor, the user has the choice between a series of drive groups with different powers. The choice depends to a large extent on the operating pressure needed by the user, which ultimately determines the load to which the piston rod 18 and the piston pin 24 will be subjected.

Using a complementary electromagnetic support for relieving the piston rod 18 and the piston pin 24 will ultimately allow an advantageous selection of a drive group from the series with a smaller power than what would be necessary without this electromagnetic support.

The present invention is in no way limited to the embodiments described above and shown in the figures. Rather, a piston compressor according to the invention may be realized in different variants without exceeding the scope of this invention.

The invention claimed is:

1. A piston compressor, comprising at least one piston compressor element (3) that is provided with a housing (8) with a compression chamber (13) in which a piston (10) is arranged to move back and forth in an axial direction (X-X') between an upper dead point and a lower dead point, the piston being driven by a drive shaft (5) driven by a rotary motor (6),
wherein between the drive shaft (5) and the piston (10), a kinematic transmission (20) is provided as a primary drive of the piston (10),
wherein the piston (10) is provided with a complementary drive (25) in the form of an electromagnetic linear drive,
wherein the kinematic transmission (20) comprises a crank and rod mechanism (21-22), and
wherein the piston compressor (1) is provided with a control (27) for determining a momentary position of a crank (21) of the crank and rod mechanism (21-22) and for activating the electromagnetic linear drive (25) at least during a part of a compression stroke of the piston (10) from the lower dead point to the upper dead point of the piston (10) based on the momentary position of the crank (21).

2. The piston compressor according to claim 1, wherein the complementary electromagnetic linear drive (25) comprises a direct electromagnetic drive of the piston (10) with one or several electrical coils (26) arranged around or along the compression chamber (13), which are capable of interacting inductively with the piston (10).

3. The piston compressor according to claim 2, wherein the piston (10) and/or a cylinder mantle (9) are provided with one or more magnets.

4. The piston compressor according to claim 1, wherein the complementary electromagnetic linear drive (25) comprises an indirect electromagnetic drive of the piston (10) with a plunger (29) which is arranged movably back and forth in a linear guide or enclosure (30) or which extends parallel to the axial direction (X-X'), and one or several coils (26), which are arranged around or along the linear guide or enclosure (30) and which are capable of interacting inductively with the plunger (29).

5. The piston compressor according to claim 4, wherein the plunger (29) is provided with one or more magnets.

6. The piston compressor according to claim 4, wherein the guide or enclosure (30) of the plunger (29) is arranged in the axial direction extension (X-X'), and wherein the plunger (29) is arranged on a rod (18) that is connected mechanically with the piston (10) and moves back and forth synchronously with the linear movement of the piston (10).

7. The piston compressor according to claim 1, wherein the piston (10) is mechanically connected with the kinematic transmission (20) by means of a linear piston rod (18) which is arranged in the axial direction extension (X-X'), and wherein the complementary electromagnetic linear drive (25) comprises an internal plunger (29) attached onto the linear piston rod (18).

8. The piston compressor according to claim 1, wherein the indirect electromagnetic drive (25) comprises an external plunger (29) which is mechanically connected with the piston (10) by means of a connection rod (32) that extends through the compression chamber (13) and reaches outside the compression chamber (13), onto which the external plunger (29) is attached.

9. The piston compressor according to claim 1, wherein the electromagnetic linear drive (25) comprises a direct electromagnetic drive and/or an indirect electromagnetic drive with one or more internal and/or external plungers (29).

10. The piston compressor according to claim 3, wherein the one or more magnets in the piston (10) are permanent magnets.

11. The piston compressor according to claim 1, wherein the control (27) is configured such that during the compression stroke or the part thereof, at least 30% of a required compression power is supplied by the complementary electromagnetic linear drive (25), and a remaining portion of the required compression power is supplied by the rotary motor (6).

12. The piston compressor according to claim 11, wherein the control (27) is configured such that during the compression stroke or the part thereof, at least 80 to 90% of the required compression power is supplied by the electromagnetic linear drive (25), and the remaining portion of the required compression power is supplied by the rotary motor (6).

13. The piston compressor according to claim 1, wherein the rotary motor (6) is an electrical motor.

14. The piston compressor according to claim 13, wherein the crank and rod mechanism comprises the crank (21), a crank pin (23), and a piston pin (24) that are supported by means of closed ball bearings (33).

15. The piston compressor according to claim 1, wherein a belt drive (7) is provided between the drive shaft (5) and the rotary motor (6).

16. The piston compressor according to claim 1, wherein the piston compressor (1) has a maximum compression power that is greater than 30 kW.

17. A method for compressing a gas by means of at least one piston compressor element (3) that is provided with a housing (8) with a compression chamber (13) in which a piston (10) is periodically moved back and forth in an axial direction (X-X') between an upper dead point and a lower dead point by a drive shaft (5) driven by a rotary motor (6), wherein between the drive shaft (5) and the piston (10), a kinematic transmission (20) is provided as a primary drive of the piston (10), wherein the piston (10) is driven by means of a complementary drive (25) in the form of an electromagnetic linear drive during at least a part of the periodic back and forth movement of the piston, wherein the kinematic transmission (20) comprises a crank and rod mechanism (21-22), and wherein the piston compressor (1) is provided with a control (27) for determining a momentary position of a crank (21) of the crank and rod mechanism (21-22) and for activating the electromagnetic linear drive (25) at least during a part of a compression stroke of the piston (10) from the lower dead point to the upper dead point of the piston (10) based on the momentary position of the crank (21).

18. The method according to claim 17, wherein during the compression stroke or the part thereof, at least 20 to 30% of a required compression power is supplied by the electromagnetic linear drive (25), and a remaining portion of the required compression power rest is supplied by the rotary motor (6).

19. The method according to according to claim 18, wherein during the compression stroke or the part thereof, at least 80 to 90% of the required compression power is supplied by the electromagnetic linear drive (25), and the remaining portion of the required compression power is supplied by the rotary motor (6).

\* \* \* \* \*